United States Patent [19]

Keller et al.

[11] Patent Number: 5,418,908
[45] Date of Patent: May 23, 1995

[54] SYSTEM FOR AUTOMATICALLY ESTABLISHING A LINK BETWEEN AN ELECTRONIC MAIL ITEM AND A REMOTELY STORED REFERENCE THROUGH A PLACE MARK INSERTED INTO THE ITEM

[75] Inventors: Robert S. Keller, Grapevine; William R. Sterrett, Dallas, both of Tex.

[73] Assignee: International Business Machines Corporation, Armonk, N.Y.

[21] Appl. No.: 963,309

[22] Filed: Oct. 15, 1992

[51] Int. Cl.[6] .................... G06F 13/00; G06F 13/14
[52] U.S. Cl. ................................. 395/200; 395/325; 395/725; 364/940.62; 364/242.95; 364/242.94; 364/919.5
[58] Field of Search ............... 395/419, 200, 725, 325

[56] References Cited

U.S. PATENT DOCUMENTS

| | | | |
|---|---|---|---|
| 4,970,678 | 11/1990 | Sladowski et al. | 364/900 |
| 4,994,985 | 2/1991 | Cree et al. | 364/514 |
| 5,097,418 | 3/1992 | Nurse et al. | 364/419 |
| 5,247,661 | 9/1993 | Hager et al. | 395/600 |
| 5,276,869 | 1/1994 | Forrest et al. | 395/600 |
| 5,283,887 | 2/1994 | Zachery | 395/500 |
| 5,333,266 | 7/1994 | Boaz et al. | 395/200 |
| 5,341,505 | 8/1994 | Whitehouse | 395/800 |

FOREIGN PATENT DOCUMENTS 0375145  6/1990  European Pat. Off. .

OTHER PUBLICATIONS

Alison, "Microsoft Corp: Microsoft Mail for PC Networks 2.1", May 27, 1991; PC Week, P87(1).
DEC, "E-Mail: Pacific Bell Connection Adds X.400 Directory Feature", Edge, Nov. 4, 1991, P38(1).
J. Nielsen "The Art of Navigating through Hypertext" Communications Of The Association For Computing Machinery, vol. 33, No. 3, Mar. 1990, New York US pp. 296–310 XP000161627.
M. Palaniappan & G. Fitzmaurice "InternetExpress: An Inter-Desktop Multimedia Data-Transfer Service" Computer, vol. 24, No. 10, Oct. 1991, Los Alamitos US pp. 58–67 XP000266116.

Primary Examiner—Thomas C. Lee
Assistant Examiner—Rehana Krick
Attorney, Agent, or Firm—A. Bruce Clay

[57] ABSTRACT

The present invention allows the inclusion of a place mark in an electronic mail item. The place mark serves to identify and link an on-line reference to the mail item. When a user sends the mail item to a recipient, the place mark but not the reference goes with the item. Upon receipt, the recipient may select the place mark during review of the mail item and the on-line reference will be automatically called and displayed. Upon completing review of the reference, the recipient may transfer control from the on-line reference to the mail item without having to back out of the reference and then initiate the electronic mail.

2 Claims, 4 Drawing Sheets

SYSTEM FOR AUTOMATICALLY ESTABLISHING A LINK BETWEEN AN ELECTRONIC MAIL ITEM AND A REMOTELY STORED REFERENCE THROUGH A PLACE MARK INSERTED INTO THE ITEM

TECHNICAL FIELD OF THE INVENTION

This invention relates in general to computer software, and in particular to a method and apparatus for inserting a place mark in an electronic mail item which allows a multi-media system to access a reference indicated by the place mark.

BACKGROUND OF THE INVENTION

The use of on-line publications systems and electronic mail systems is rapidly increasing. For individuals in an organization, the use of an electronic mail system is useful for sending notes, messages, letters, etc., within the same office or across the country. Simply by entering information into an electronic mail screen, one person can electronically send that information to another person for immediate review or action.

Additionally, with the access to many on-line databases which provide information such as, for example, airline schedules, weather, stock reports, news articles, etc., users of a terminal have many references literally at their fingertips. It is a simple matter for a user to call up an on-line service to obtain a copy of a reference contained therein for review.

If a first user desires to send a message along with a reference from an on-line source to another person, it is currently necessary to either type the entire information from the reference into the note, or type in identifying information to allow the recipient to locate the reference in the on-line service. If the text of the reference is typed into the message, the system ends up storing multiple copies of the information which wastes disk, tape, or permanent storage space. If identifying information to locate the reference is entered into the message, the recipient must exit the processing of the mail to go to the on-line publications system to locate and view the reference. In either case, is wasteful effort for both the sender and the recipient.

Thus, there is a need for a method and apparatus which allows a user to enter a place mark in a note or message which would refer to an on-line publications system reference and send the note to a recipient. The recipient would then be able to select the place mark during viewing of the electronic mail. After viewing the selected on-line reference, control is returned to the electronic mail facility.

SUMMARY OF THE INVENTION

The present invention provides a method and apparatus for linking an on-line reference and an electronic mail item which eliminates or substantially reduces problems in the prior art. The present invention allows a recipient of an electronic mail item to automatically present an on-line reference identified in the mail item without having to back out of the mail and enter the on-line service. In addition, sender effort is reduced by not requiring the manual typing of the reference into the mail item.

In accordance with one aspect of the present invention, a method of providing an on-line reference with an electronic mail item is disclosed. An on-line reference is designated in the mail item with a place mark. The mail item and the place mark, but not the reference, are then transmitted to a recipient. The recipient may then review the reference while in the mail by selecting the place mark. The on-line service is then automatically called and the reference therein is presented for the recipient. Upon completion of the recipient review, control is transferred back to the mail system.

It is a technical advantage of the present invention that a user does not have to manually type a reference into a mail item. It is a further technical advantage of the present invention in that storage space is saved by not having duplicate copies of a reference. It is a further technical advantage of the present invention that the recipient of a mail item with a cited reference is not required to back out of the mail service and enter the on-line service to review a cited reference.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
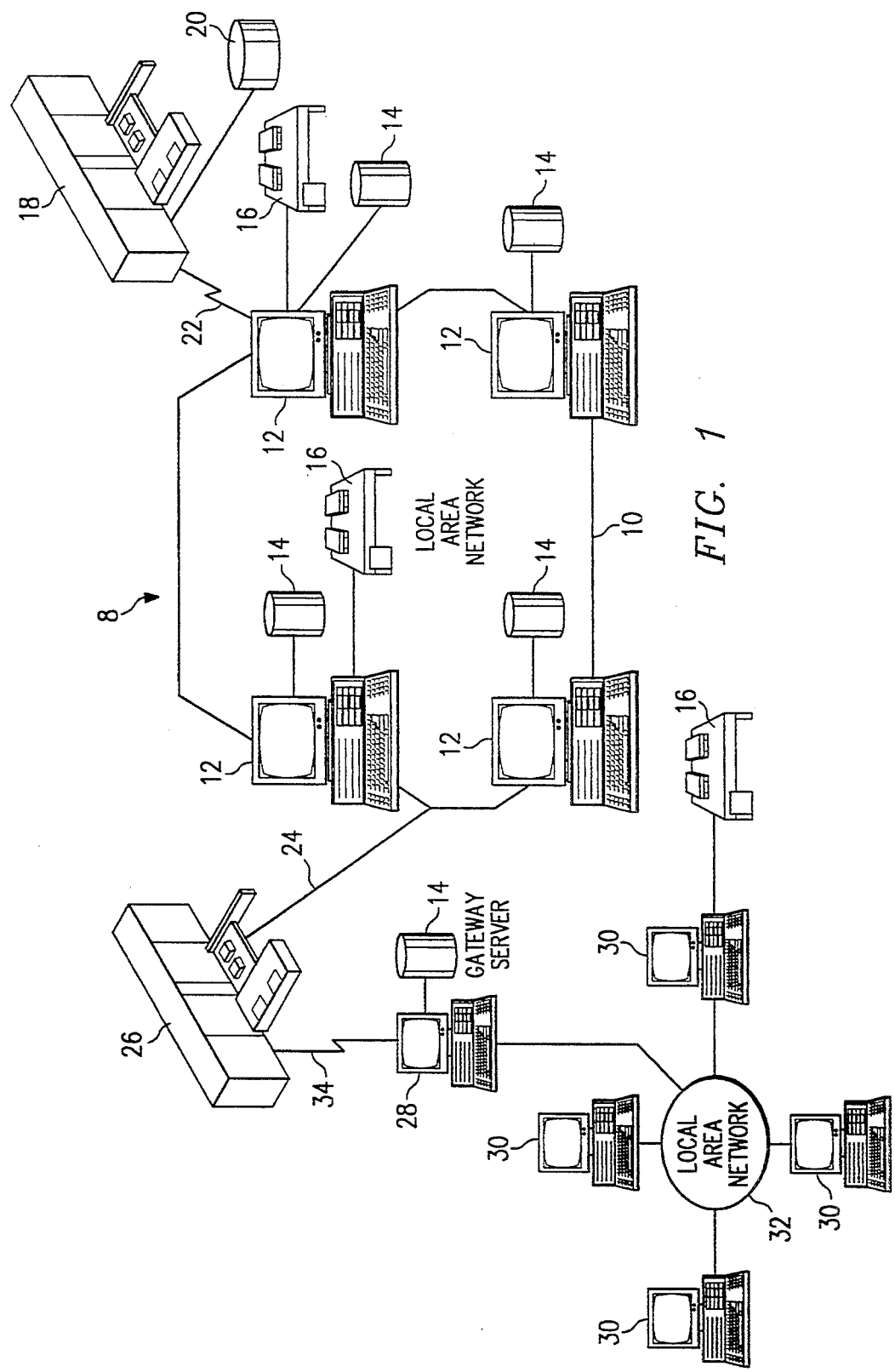
FIG. 1 is a schematic illustration of a data processing system in accordance with the present invention.

Referring to FIG. 1, there is depicted a graphical representation of a data processing system 8 which may be utilized to implement the present invention. As may be seen, data processing system 8 may include a plurality of networks, such as Local Area Networks (LAN) 10 and 32, each of which preferably includes a plurality of individual computers 12 and 30, respectively. Those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial difference from LAN 32. For example, LAN 32 may be located in California, while LAN 10 may be located within Texas, and mainframe computer 18 may be located in New York.

Figure 2:
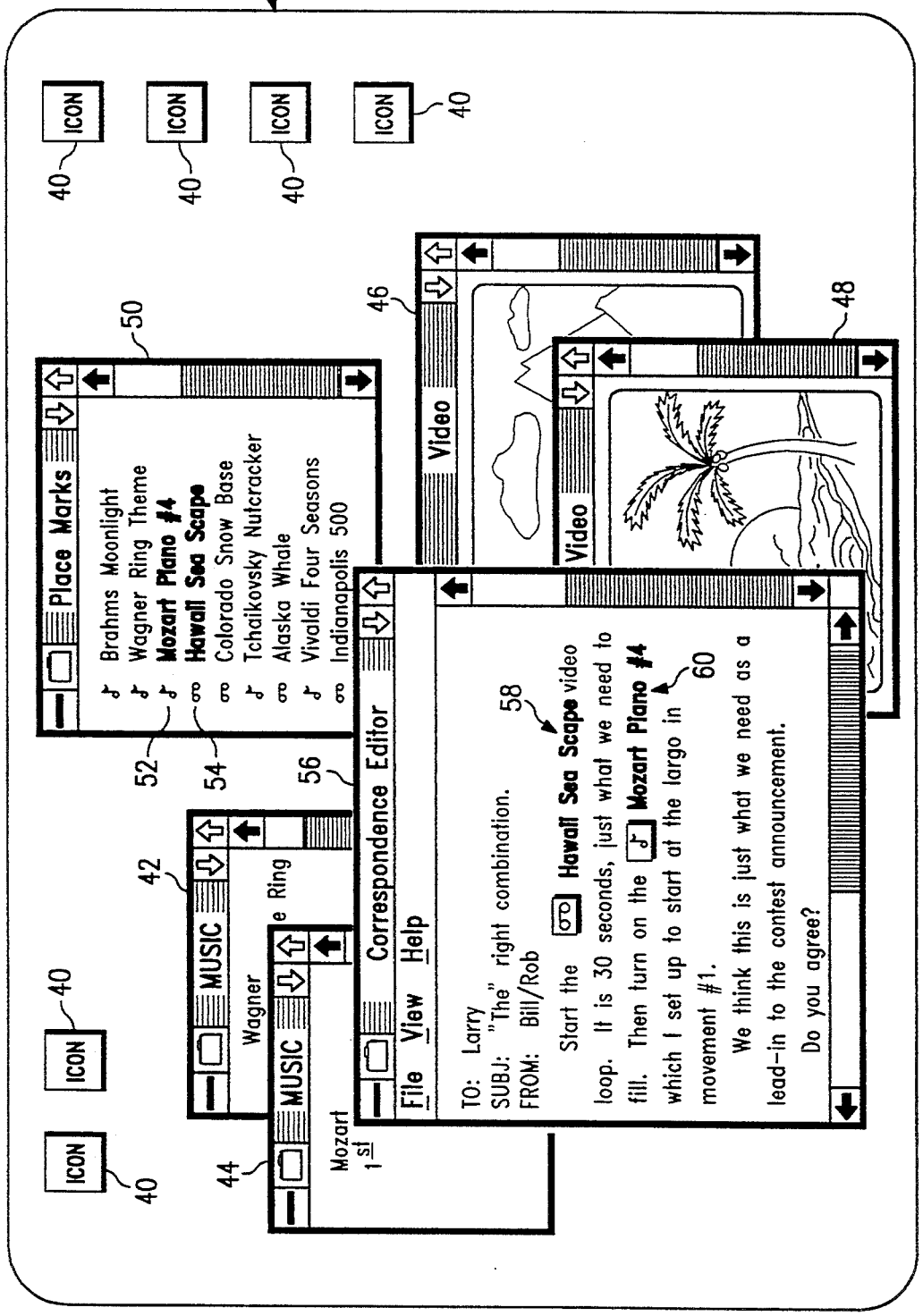
FIG. 2 is a graphical representation of the use of the present invention.

Referring to FIG. 2, a computer screen 39 is shown with an embodiment of the present invention represented thereon. As is typical, a plurality of graphical objects 40, such as icons, are arranged on the screen 39. A plurality of windows opened on the screen 39 for implementation of the present invention are also shown. Represented by windows 42 and 44 are music audios which have been started and subsequently stopped. Similarly, windows 46 and 48 represent videos which have been started and subsequently stopped. In accordance with the present invention, whenever one of the windows 42, 44, 46, or 48 are stopped, pop-up windows (as are known in the art) are presented to the user. The user must answer appropriate information (such as, for example, a user supplied description and start/stop points) into the pop-up window. The user then selects the named reference as a place mark.

After indicating that the named reference is to be used for a place mark, a place marks list window 50 is created. The window 50 includes a place mark symbol such as, for example, musical note 52 and video symbol 54, along with the user selected name for the place mark.

In the implementation of the present invention, after the items have been inserted into the place mark list window 50, a user may then incorporate the multi-media information into an electronic mail item. In the example shown in FIG. 2, a correspondence editor window 56 is shown. The user has typed an electronic mail note to a recipient and has included therein two place marks. During the entry of the text into window 56, the user may drag the place mark symbol and corresponding user name to the appropriate place in the text. For example, the user has dragged the symbol and name Hawaii Seascape, generally identified by the reference numeral 58, and the symbol and user name Mozart Piano Number 4, generally identified by the reference numeral 60, to the text in the window 56. Upon completion of the electronic mail note in the window 56, the user may then send the note to a recipient. Upon receiving the note, the recipient may select (by any appropriate method such as clicking on the symbol with a mouse) the place mark and the on-line referenced multi-media material identified therein will be automatically called and presented to the recipient. Upon completion of the review of the multi-media object by the recipient, control will be transferred back to the electronic mail item for continued use thereof.

Figure 3:
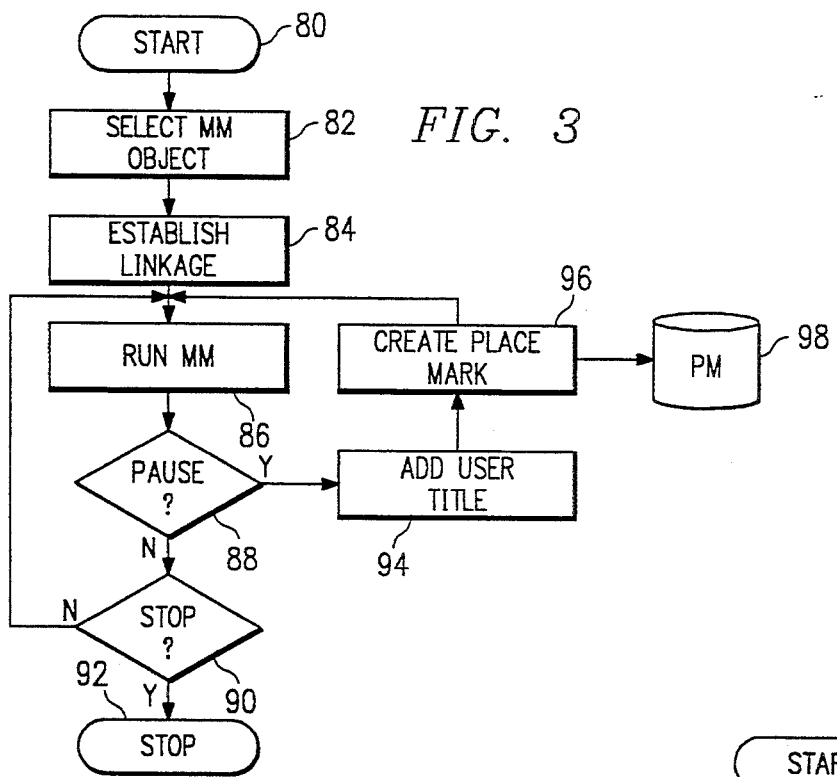
FIG. 3 is a flowchart depicting place mark creation.

Referring to FIG. 3, a flowchart illustrating the creation of a place mark is illustrated. The present invention starts at 80 and a multi-media object is selected at block 82. Linkage is established to the multi-media object at block 84. The multi-media object is then run at block 86. At decision block 88, it is determined whether or not to pause. If the response to decision block 88 is no, it is determined whether or not to stop at decision block 90. If the response to decision block 90 is yes, the present invention stops at 92. If the response to decision block 90 is no, the present invention returns to block 86 to run the multi-media object. Returning to decision block 88, if the response thereto is yes, a user title is added at block 94. A place mark is created at block 96 and placed in storage 98, followed by a return to run the multi-media object at block 86.

Figure 4:
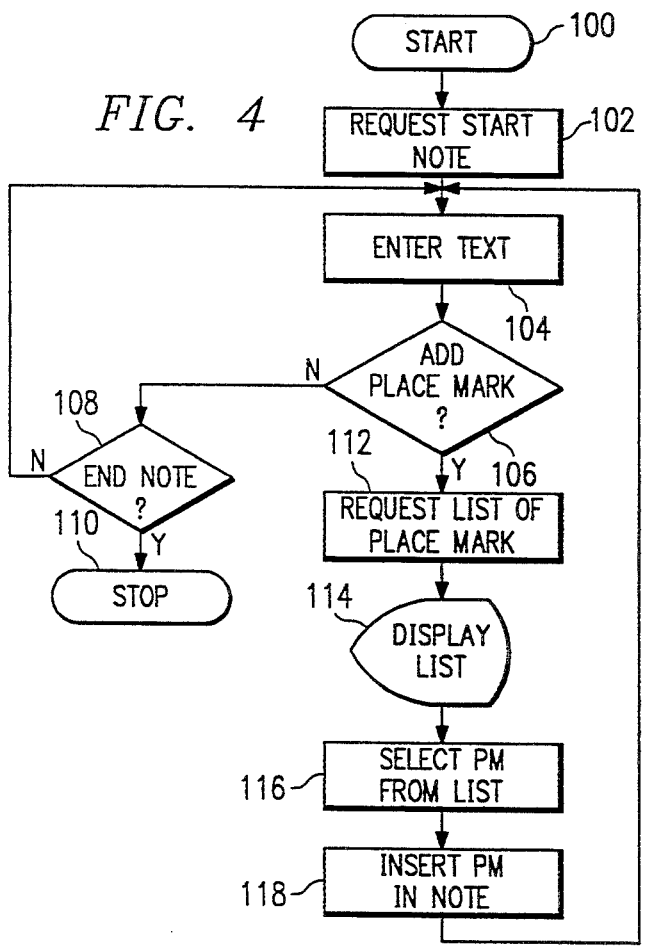
FIG. 4 is a flowchart depicting place mark insertion.

Referring to FIG. 4, a flowchart illustrating the insertion of a place mark is shown. The present invention starts at 100 followed by a request to start creation of a note at block 102. At block 104, text is entered into the note. At decision block 106, it is determined whether or not a place mark is to be added. If the response to decision block 106 is no, it is determined at decision block 108 whether or not to end the note. If the response to decision block 108 is yes, the present invention stops at 110. If the response to decision block 108 is no, the present invention returns to block 104 to continue entering text. Returning to decision block 106, if the response thereto is yes, a list of place marks is requested at block 112. The list is displayed at 114 and a place mark is selected from the list at 116. The place mark is then inserted in the note at block 118 followed by a return to block 104 to continue entering text.

Figure 5:
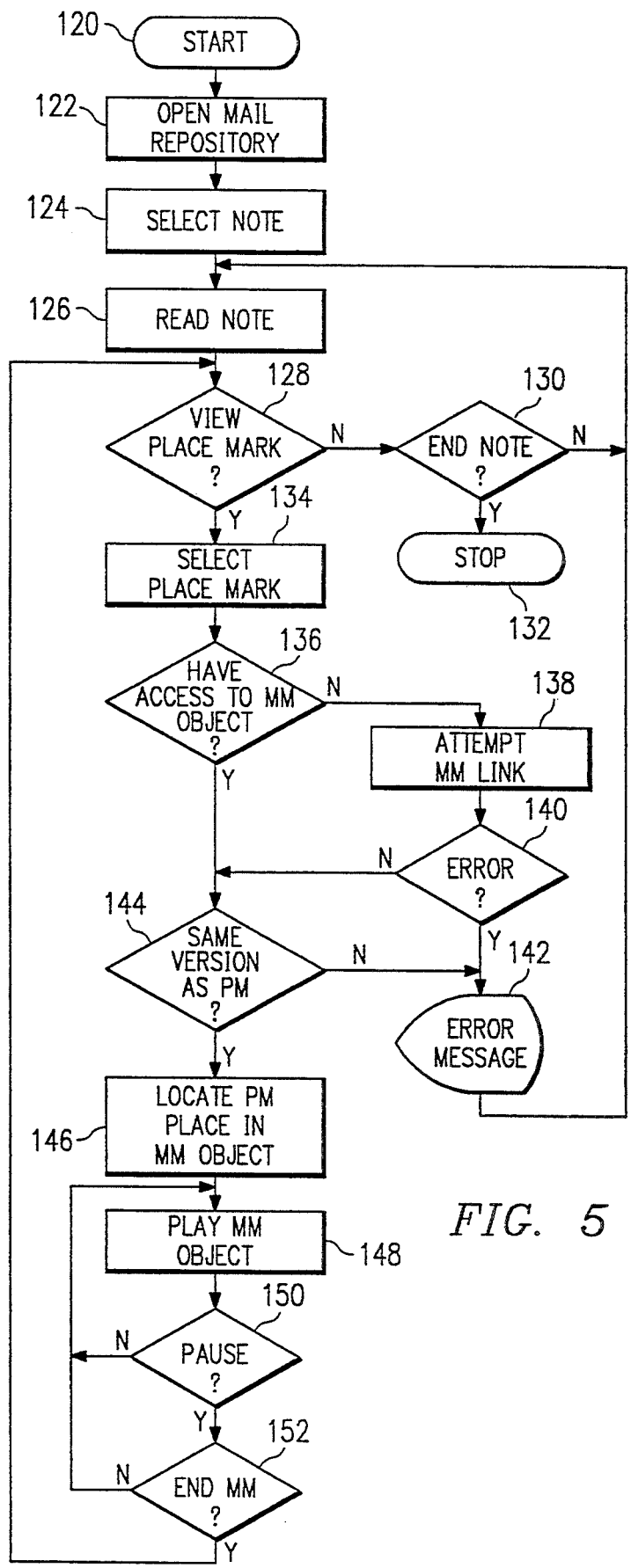
FIG. 5 is a flowchart depicting place mark usage.

Referring to FIG. 5, a flowchart illustrating the use of a place mark is shown. The present invention starts at 120 followed by an opening of the mail repository at block 122. At block 124, a note is selected for reading. At block 126, the note is read followed by decision block 128 where it is determined whether or not to view a place mark. If the response to decision block 128 is no, it is determined at decision block 130 whether or not to end the note. If the response to decision block 130 is yes, the present invention stops at 132. If the response to decision block 130 is no, the present invention returns to block 126 to continue reading the note. Returning to decision block 128, if the response thereto is yes, a place mark is selected at block 134. It is then determined at decision block 136 whether or not there is local access to the multi-media object identified in the place mark. If the response to decision block 136 is no, an attempt is made to link to the multi-media object via the LAN at block 138. It is determined at decision block 140, whether or not an error is detected. If the response to decision block 140 is yes, an error message is produced at block 142 followed by a return to block 126 to allow continued reading of the note. If the response to decision block 140 is no, it is determined at decision block 144 whether or not the multi-media object is the same version as in the place mark. Similarly, returning to decision block 136, if the response thereto is yes, the decision block 144 is directly accessed therefrom. If the response to decision block 144 is no, an error message is created at 142, as previously discussed above. If the response to decision block 144 is yes, the place mark place in the multi-media object is located at block 146. The multi-media object is then played at block 148. At decision block 150, it is then determined whether or not to pause. If the response to decision block 150 is no, the multi-media object continues to play at block 148. If the response to decision block 150 is yes, it is determined at decision block 152 whether or not to end the multi-media presentation. If the response to decision block 152 is no, the multi-media object resumes play at block 148. If the response to decision block 152 is yes, the present invention returns to decision block 128 where it is determined whether or not to view a place mark as previously described above.

In summary, the present invention provides an improvement over the prior art which saves both user time and system storage. By utilizing the present invention, a user may insert place marks into an electronic mail item that do not require manual typing or sending of the entire reference. Similarly, a recipient is not required to exit the electronic mail item and enter an on-line system to review a reference. A user now need only insert the place mark and the recipient may then call the referenced item by selecting the place mark.

Although the present invention has been particularly shown and described with reference to a preferred embodiment, it will be understood by those skilled in the art that various changes in form and detail may be made without departing from the spirit and the scope of the invention.

What I claim Is:

1. A method of electronically linking an electronic mail item in a computer system to a remotely stored reference available from a separate on-line publication service, comprising the steps of:

inserting a symbol to represent a place mark into the electronic mail item on a first terminal of the computer system, said symbol indicating a desired location in the mail item for a user to view the remotely stored reference;

entering predefined reference identification information into said place mark in order to establish an electronic link from the electronic mail item to the separate on-line publication service and the remotely stored reference thereon through said place mark;

transmitting said electronic mail item, said symbol, and said place mark but not the remotely stored reference from said first terminal of the computer system to at least a second terminal of the computer system;

selecting said symbol in the electronic mail item on said at least a second terminal of the computer system;

automatically connecting and searching the separate on-line publication service for the remotely stored reference based upon the predefined reference identification information in said place mark;

displaying the remotely stored reference on said at least a second terminal of the computer system; and returning control to the electronic mail item by closing said remotely stored reference upon completion of review thereof.

2. A system for electronically linking an electronic mail item in a computer system to a remotely stored reference available from a separate on-line publication service, comprising:

means for inserting a symbol to represent a place mark into the electronic mail item on a first terminal of the computer system, said symbol indicating a desired location in the mail item for a user to view the remotely stored reference;

means for entering predefined reference identification information into said place mark in order to establish an electronic link from the electronic mail item to the separate on-line publication service and the remotely stored reference thereon through said place mark;

means for transmitting said electronic mail item, said symbol, and said place mark but not the remotely stored reference from said first terminal of the computer system to at least a second terminal of the computer system;

means for selecting said symbol in the electronic mail item on said at least a second terminal of the computer system;

means for automatically connecting and searching the separate on-line publication service for the remotely stored reference based upon the predefined reference identification information in said place mark;

means for displaying the remotely stored reference on said at least a second terminal of the computer system; and means for returning control to the electronic mail item by closing said remotely stored reference upon completion of review thereof.

* * * * *